R. CORNELIUS.
Lamp.
No. 3,028.
Patented April 6, 1843.
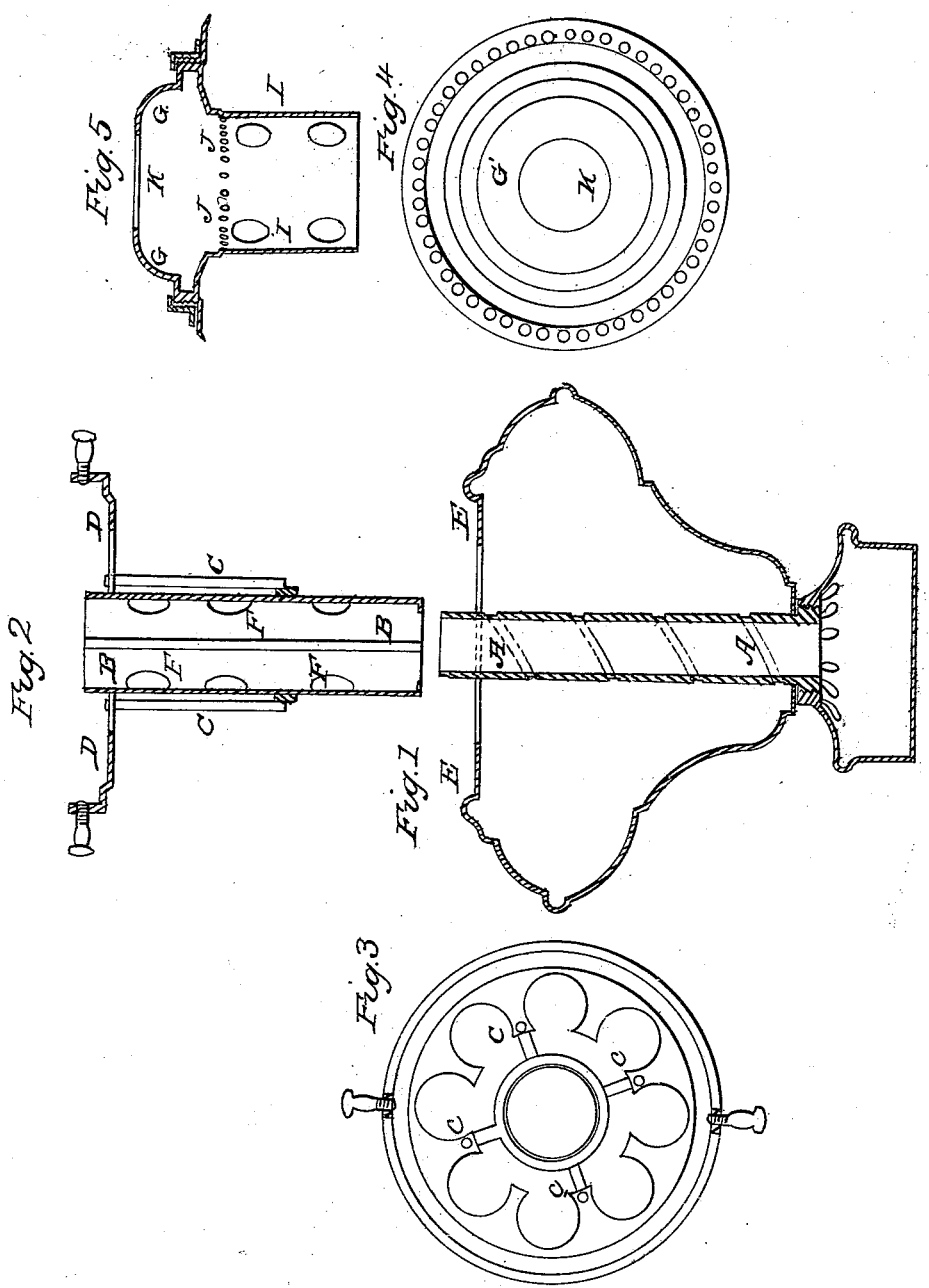

UNITED STATES PATENT OFFICE.

ROBERT CORNELIUS, OF PHILADELPHIA, PENNSYLVANIA.

LARD-LAMP WITH ARGAND BURNER.

Specification of Letters Patent No. 3,028, dated April 6, 1843; Antedated April 1, 1843.

*To all whom it may concern:*

Be it known that I, ROBERT CORNELIUS, of the city of Philadelphia, in the State of Pennsylvania, have invented a new and useful manner of constructing lamps having Argand burners, by which they are adapted to the burning of lard and other concrete fatty matters and which may also be advantageously used for the burning of the different kinds of oil used for the procuring of artificial light; and I do hereby declare that the following is a full and exact description thereof.

In the lamps hitherto constructed for the burning of lard and other fatty substances, the general aim has been to conduct a large portion of the heat, produced by the flame, immediately into the body of the lamp so as to produce a complete fusion of the lard &c.; and when this has been effected, there has necessarily resulted such a diminution of heat at the point of ignition as has interfered materially with the intensity of combustion upon which the brilliancy of the light is dependent. In my lamp, under its various forms, a principal aim has been to conduct no more heat down from the flame than is necessary to fuse the lard in the vicinity of the wick; and this I have effected to such extent as to obtain a light from lard equally intense with that usually obtained from the best sperm oil.

In the accompanying drawing, Figure 1, is a section through the body of a lamp having an Argand burner, and so constructed as that the principle of carrying off no more heat from the points of ignition than is necessary for fusing the lard in the neighborhood of the wick, is fully carried out.

A, A, is the center tube, having the usual spiral thread cut on its exterior, for the raising or lowering of the wick by the revolving of the runner.

Fig. 2, is a section of a tube B, B, which is attached to the runner, and is made to surround the wick, in the usual manner, and by the turning of this, the wick may be raised or lowered. This tube is suspended within the body of the lamp by means of four wires, C, C, that descend from the runner, or swivel plate, D, D, which drops into the recess, E, E, Fig. 1.

Fig. 3, is a top view of this runner or swivel plate, showing the manner in which it is made to isolate the tube, B, B, from the metal constituting the body of the lamp. C, C, are the upper ends of the wires by which the said tube is suspended from the runner. The tube, B, B, is perforated with holes, F, F, to admit the lard freely to the wick.

Fig. 4 is a top view, and Fig. 5, is a section of the glass holder, and of the deflector, G, and its appendage; said deflector being formed as in the well known solar lamp; in the passing of the flame through the opening K, in the deflector, it will become heated, and the heat thus communicated to it I convey down into the lard by means of a tube, I, which is in one piece with the deflector, and, when in place, surrounds the tube, C, C, for half its length, more or less; by the aid of the tube, I, the lard will be fused in the vicinity of the wick tube, the heat being conveyed thereto from the deflector, while the body of the lamp, and the great bulk of the lard will, in the first instance, be but little affected, although the whole will be eventually fused. Instead of the tube, I, metallic rods may extend down from the deflector plate, and will answer the same purpose. The air may be admitted into the deflector through openings formed in the usual way, or through holes J, J, formed around the upper end of the tube, I, in which case the connection of the tube with the deflector will be rendered the more continuous. There may be other variations made in matters of detail in the construction of this lamp, but in all of them the main principle to be kept in view is the having no more metal in contact with the point of combustion than is absolutely required for the melting of the lard in the immediate neighborhood of the wick, the reason of which is above fully set forth.

Having thus fully described the nature of my invention, and shown the manner in which my lamp is made to operate, what I claim therein as new, and desire to secure by Letters Patent, is—

The manner herein described and represented, or any other manner which is substantially the same in principle and operation, by which the burner tube B, B, is suspended within the body of the lamp; and the tube, I, or any equivalent device, is made to melt the lard by means of the heat communicated to it from a deflector, or other appendage, operating in a like manner; by which arrangement and combination of parts, the portion of the wick that is undergoing combustion is isolated as completely from the metallic body of the lamp as can conveniently be effected, and the proposed end attained.

ROBERT CORNELIUS.

Witnesses:
   Thos. P. Jones,
   John Hite.